No. 756,996. PATENTED APR. 12, 1904.
S. F. VANCE.
CULTIVATOR.
APPLICATION FILED JULY 7, 1903.
NO MODEL.
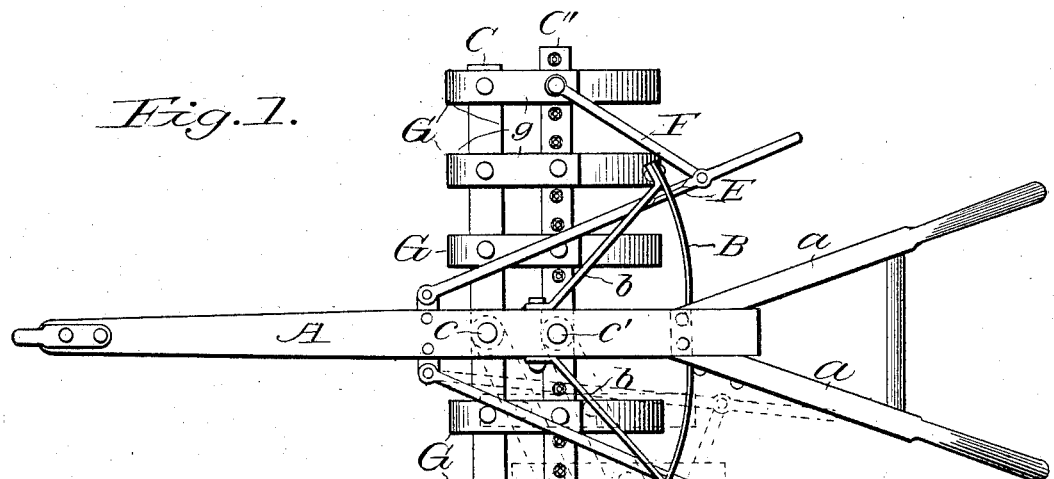
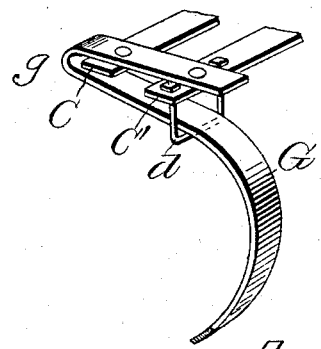
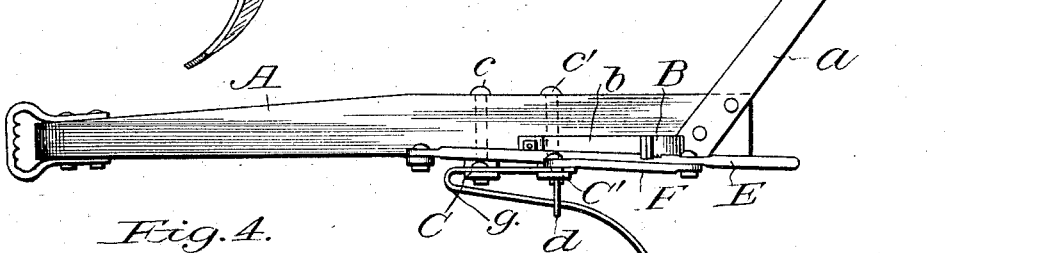
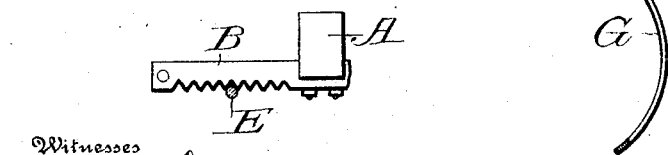
Witnesses
C. H. Walker
J. M. Moore
Inventor
Sidney F. Vance
By Eugene M. Johnson
Attorney No. 756,996. Patented April 12, 1904.

UNITED STATES PATENT OFFICE.

SIDNEY F. VANCE, OF SALMON, TEXAS, ASSIGNOR OF ONE-HALF TO LORENZO D. WOODARD, OF ELKHART, TEXAS.

CULTIVATOR.

SPECIFICATION forming part of Letters Patent No. 756,996, dated April 12, 1904.

Application filed July 7, 1903. Serial No. 164,562. (No model.)

*To all whom it may concern:*

Be it known that I, SIDNEY F. VANCE, a citizen of the United States, residing at Salmon, in the county of Anderson and State of Texas, have invented new and useful Improvements in Cultivators, of which the following is a specification.

This invention appertains to improvements in cultivators, the object being to provide an implement which may be used either as a cultivator or as a harrow; and the invention consists in the combination, with a beam and its handles, of parallel and adjustable bars attached pivotally to the beam and to each tooth, the adjusting means comprising levers fulcrumed to the beam in advance of the tooth-carrying bars, to which they are connected by links, such levers engaging ratchet-bars attached to the beam, as will be hereinafter set forth, and specifically pointed out in the claims.

In the accompanying drawings, Figure 1 is a plan view of an agricultural implement made in accord with the invention, the bars carrying the teeth being shown as extended to occupy a position at right angles to the beam, the dotted lines showing the bars in an intermediate position and extending rearward. Fig. 2 is a side elevation. Fig. 3 is a detail perspective view showing the manner of attaching the teeth to their supporting and adjusting bars, and Fig. 4 is a rear elevation of one of the ratchet-bars.

In the drawings, A refers to a beam having handles $a$ and at its forward end a clevis. The beam carries near its rear end ratchet-bars B, which extend sidewise and forward, the ends thereof being braced to the beam by braces $b$. The teeth of the ratchet-bars are formed in its lower edge, as shown. To the under side of the beam are pivotally secured, by means of bolts $c$ $c'$, flat bars C C', which project laterally from the beam, the bars on each side of the beam being maintained parallel by reason of their connection with the teeth which are carried thereby. The rear bars C' C' carry depending loops or bails $d$, through which pass the cultivator blades or teeth G, the bails holding the teeth against sidewise and downward movement, the teeth being permitted to have a slight upward movement when undue pressure comes upon the lower end of a tooth.

In advance of the bars C C, upon a plate attached to the beam A, there are pivoted a pair of levers E E, which are shaped below the ratchet-bars B to engage the teeth thereof, the rear ends of the levers extending considerably beyond the ratchet-bars to provide handles, which when depressed disengage the beveled portions of the levers from the teeth of the ratchet-bars. The levers E E have pivotally attached, so as to be rear of the ratchet-bars, links F F, the forward ends of the links engaging the outer ends of the bars C' C', and by depressing the handles of the levers and moving them the position of the parallel bars and the teeth carried thereby may be varied. The levers when released will be forced upward to engage the teeth of the ratchet-bars.

The teeth G G are each made up of a single piece of flat spring metal, the upper portion of each tooth being shaped to provide return-bends $g$, from which the upper portion of the tooth extends rearward and is maintained in pivotal engagement with the bars C C'. The part of each tooth which is below the bar C' normally bears upon the cross-bar of the bails, which tends to throw the front bars upward, the bars or the upper members of the teeth carried thereby will engage the levers and raise the rear ends, so that they will engage the ratchet-bars, and in use when the front bar is moved downward the rear bar C' will be forced upward, and they then hold the rear ends of the levers in engagement with the ratchet-bar. By simply depressing the levers and moving them sidewise the distance between the teeth may be varied to suit different crops, or so that the implement may be used either as a cultivator or as a harrow.

Having thus set forth my invention, what I claim as new, and desire to secure by Letters Patent, is—

1. In a cultivator, the combination with a beam having handles, of parallel bars arranged in pairs the bars being pivoted directly to the beam, levers pivoted to the beam in advance of the parallel bars, links attached to the levers and to the bars, and ratchet-bars attached to the rear portion of the beam to project therefrom and be engaged by the levers, substantially as shown.

2. In a cultivator, the combination with the beam and handles therefor, of parallel bars pivoted to the beam, teeth which connect the bars to each other, curved ratchet-bars attached to the beam rear of the parallel bars, levers pivoted to the beam in advance of the bars and links pivoted to the outer ends of the rear bars and to the levers rear of the ratchet-bars, substantially as shown.

3. In a cultivator, the combination with a beam and its handles, of parallel bars pivoted to the beam, levers pivoted to the beam and connected to the bars by links, ratchet-bars attached to the beam to be engaged by the levers, spring-teeth pivotally connected to the bars, and bails through which pass the spring-teeth, the teeth being vertically movable between the side members of the bail, for the purpose set forth.

In testimony whereof I affix my signature in the presence of two witnesses.

SIDNEY × F. VANCE.
his mark

Witnesses:
C. J. HORN,
E. KENNEDY.